US009493706B2

(12) United States Patent
Hintze-Brüning et al.

(10) Patent No.: US 9,493,706 B2
(45) Date of Patent: Nov. 15, 2016

(54) WATERBORNE EFFECT BASE COATS HAVING IMPROVED OPTICAL PROPERTIES

(75) Inventors: Horst Hintze-Brüning, Münster (DE); Hans-Peter Steiner, Sendenhorst (DE); Fabrice Leroux, Les Cendre (FR); Anne-Lise Troutier-Thuilliez, La Roche Blanche (FR); Thomas Stimpfling, Clermont-Ferrand (FR)

(73) Assignees: BASF Coatings GmbH, Münster (DE); UNIVERSITÉ BLAISE PASCAL, Clermont-Ferrand (FR)

( * ) Notice: Subject to any disclaimer, the term of this patent is extended or adjusted under 35 U.S.C. 154(b) by 977 days.

(21) Appl. No.: 13/320,403

(22) PCT Filed: Feb. 25, 2010

(86) PCT No.: PCT/EP2010/001159
§ 371 (c)(1),
(2), (4) Date: Dec. 14, 2011

(87) PCT Pub. No.: WO2010/130308
PCT Pub. Date: Nov. 18, 2010

(65) Prior Publication Data
US 2012/0135246 A1 May 31, 2012

(30) Foreign Application Priority Data
May 13, 2009 (DE) ........................ 10 2009 021 071

(51) Int. Cl.
| C09D 167/06 | (2006.01) |
| C08K 3/22 | (2006.01) |
| C09K 19/52 | (2006.01) |
| C09D 5/36 | (2006.01) |
| C09D 7/12 | (2006.01) |
| C09K 19/54 | (2006.01) |
| C08K 3/00 | (2006.01) |
| C08L 75/04 | (2006.01) |

(52) U.S. Cl.
CPC ................ C09K 19/52 (2013.01); C09D 5/36 (2013.01); C09D 7/1216 (2013.01); C09D 167/06 (2013.01); C09K 19/542 (2013.01); C08K 3/0033 (2013.01); C08K 3/22 (2013.01); C08L 75/04 (2013.01); Y10T 428/31609 (2015.04)

(58) Field of Classification Search
CPC .. C09D 167/06; C09D 7/1225; C09D 7/1216; C08K 3/22; C08K 3/0033; C09K 19/52; C09K 2019/521
See application file for complete search history.

(56) References Cited

U.S. PATENT DOCUMENTS

| 3,936,342 A | 2/1976 | Matsubara et al. |
| 4,914,148 A | 4/1990 | Hille et al. |
| 5,326,815 A | 7/1994 | Serdiuk et al. |
| 5,399,329 A | 3/1995 | Schutz et al. |
| 5,589,228 A | 12/1996 | Wegner et al. |
| 5,824,733 A | 10/1998 | Dobert et al. |
| 6,514,473 B2 | 2/2003 | Noweck et al. |
| 6,677,045 B1* | 1/2004 | Meisenburg ........... B05D 7/536 427/508 |
| 6,770,705 B2 | 8/2004 | Vanier et al. |
| 2001/0016230 A1 | 8/2001 | Matsuoka et al. |
| 2005/0022693 A1 | 2/2005 | Sinko et al. |
| 2005/0123684 A1 | 6/2005 | Makowski et al. |
| 2005/0235873 A1 | 10/2005 | Gichuhi et al. |
| 2008/0311410 A1* | 12/2008 | Schomaker et al. ........ 428/454 |
| 2012/0214894 A1 | 8/2012 | Schwalm et al. |
| 2012/0269978 A1* | 10/2012 | Hintze-Bruning et al. ........ 427/407.1 |

FOREIGN PATENT DOCUMENTS

| DE | 3545618 A1 | 6/1987 |
| DE | 3636368 A1 | 4/1988 |
| DE | 4005961 A1 | 8/1991 |
| DE | 3881046 T2 | 11/1993 |
| DE | 4418490 A1 | 11/1995 |
| EP | 0282619 A1 | 9/1988 |
| EP | 0357844 A1 | 3/1990 |
| EP | 0788523 B2 | 11/2002 |
| EP | 1192200 B1 | 4/2003 |
| EP | 1371683 A1 | 12/2003 |
| EP | 1514842 A1 | 3/2005 |
| EP | 1840113 A1 | 10/2007 |
| JP | 2002180000 A | 6/2002 |
| JP | 2004091647 A | 3/2004 |
| JP | 2004137412 A | 5/2004 |
| JP | 2005270861 A | 10/2005 |
| JP | 2006122732 A | 5/2006 |
| WO | WO8803159 A1 | 5/1988 |
| WO | WO95/29961 A1 | 11/1995 |

(Continued)

OTHER PUBLICATIONS

International Preliminary Report on Patentability for International application No. PCT/EP2010/001159 dated Dec. 12, 2011.
Bradley Finnigan, et al.; "Segmented Pulyurethane Nanocomposites: Impact of Controlled Particle Size Nano fillers on the Morphological Response to Uniaxial Deformation"; Macromolecules 2005, Bd. 38, Nr. 17, pp. 7386-7396; Jul. 26, 2005; XP-002514001.
John W. Anthony, Richard A. Bideaux, Kenneth W. Bladh, and Monte C. Nichols, Eds., Handbook of Mineralogy, Mineralogical Society of America, chantilly, VA 20151-1110, USA. http://www.handbookofmineralogy.org/. Manasseite, 2005.
M.L. Nobel, et al.; Waterborne nanocomposite resins for automotive coating applications; Progress in Organic Coatings 58 (2007) pp. 96-104.
Database WPI Week 200636; Thomson Scientific, London, GB; AN 2006-346667; XP002514004, 2006.
Database WPI Week 200434; Thomson Scientific, London, GB, AN 2004-359389; XP002514419, 2004.
Database WPI Week 200434; Thomson Scientific, London, GB, AN 2005-767570; XP002514481, 2005.
Database WPI Week 200434; Thomson Scientific, London, GB, AN 2002-725984; XP002514482, 2002.
Koray Yurekli, et al.; Influence of Layered Silicates on the Phase-Seperated Morphology of PS-PVME Blends; Macromolecules 2003, Bd. 36, pp. 7256-7267; Aug. 21, 2003; XP-002514685.

(Continued)

Primary Examiner — Monique Jackson
(74) Attorney, Agent, or Firm — Servilla Whitney LLC

(57) ABSTRACT

Disclosed is an aqueous effect basecoat material comprising at least one liquid-crystalline aqueous preparation (WZ) in fractions of 1% to 99% by weight, based on the aqueous basecoat material, at least one film-forming polymer (FP), and at least one effect pigment (EP).

10 Claims, No Drawings

(56) References Cited

FOREIGN PATENT DOCUMENTS

| WO | WO01/02457 A1 | 1/2001 |
| WO | WO0104050 A1 | 1/2001 |
| WO | WO0248261 A2 | 6/2002 |
| WO | WO02/053658 A2 | 7/2002 |
| WO | WO03016413 A1 | 2/2003 |
| WO | WO2005052077 A2 | 6/2005 |
| WO | WO2007/065861 A1 | 6/2007 |
| WO | WO2007065877 A1 | 6/2007 |
| WO | WO2007126673 A2 | 11/2007 |
| WO | WO2009062623 A1 | 5/2009 |

OTHER PUBLICATIONS

English Translation of International Preliminary Report on Patentability for International Application No. PCT/EP2008/009326 issued Jun. 1, 2010.
International Search Report for International Application No. PCT/EP2008/09326 mailed Mar. 9, 2009.
Written Opinion for International Application No. PCT/EP2008/009326 mailed Mar. 9, 2009.
English Translation of International Preliminary Report on Patentability for International Application No. PCT/EP2008/009327 issued Jun. 1, 2010.
International Search Report for International Application No. PCT/EP2008/009327 mailed Mar. 9, 2009.
Written Opinion for International Application No. PCT/EP2008/009327 mailed Mar. 9, 2009.
English Translation of International Preliminary Report on Patentability for International Application No. PCT/EP2010/001420 issued Nov. 29, 2011.
International Search Report for International Application No. PCT/EP2010/001420 mailed Sep. 29, 2010.
Written Opinion for International Application No. PCT/EP2010/001420 mailed Sep. 29, 2010.
Machine Translation of JP2004137412A, 2011.
Machine Translation of JP2005270861A, 2011.
Limin Qi, et al.; Crystal Design of Barium Sulfate using Double-Hydrophilic Block Copolymers; Communications, Bd. 39, Nr. 3, Jan. 1, 2000, pp. 604-607.
N. Negrete-Herrera, et al.; Synthesis of polymer/Laponite nanocomposite latex particles via emulsion polymerization using silylated and cation-exchanged Laponite clay platelets; Progress in Solid State Chemistry, Bd. 34, Dec. 31, 2006, pp. 121-137.
International Preliminary Report on Patentability for International Application No. PCT/EP2008/009325 issued Jun. 1, 2010, 9 pages.
International Search Report for International application No. PCT/EP2008/009325 mailed Mar. 17, 2009, 8 pages.
Written Opinion for International Application No. PCT/EP2008/009325 mailed Mar. 17, 2009, 9 pages.
International Search Report for International Application No. PCT/EP2010/001159 dated May 28, 2010.
Anne-Lise Troutier-Thuilliez, et al.; "Layered particle-based polymer composites for coatings: Part I. Evaluation of layered double hydroxides"; Progress in Organic Coatings, Elsevier V. 64 (2009) pp. 182-192.
Horst Hintze-Bruening, et al.; "Layered particle-based polymer composites for coatings: Part II—Stone chip resistant automotive coatings"; Progress in Organic Coatings, Elsevier V. 64, (2009), pp. 193-204.
Written Opinion for International Application No. PCT/EP2010/001159, Dated Nov. 13, 2011.

\* cited by examiner

WATERBORNE EFFECT BASE COATS HAVING IMPROVED OPTICAL PROPERTIES

CROSS REFERENCE TO RELATED APPLICATIONS

This application is a National Phase Application of Patent Application PCT/EP2010/001159 filed on 25 Feb. 2010, which claims priority to DE 10 2009 021 071.7, filed 13 May 2009, both of which are hereby incorporated by reference in their entirety.

FIELD OF THE INVENTION

For aqueous coating compositions, which particularly on account of their improved environmental properties are showing a permanently increasing share of the market for coating materials, there is great interest, for the purpose of improving the rheological properties, in additives based on inorganic layered composites.

BACKGROUND OF THE INVENTION

Particularly in connection with the production of multi-coat paint systems for automotive production-line (OEM) finishing, inorganic layered composites, such as, for example, clay minerals, such as, more particularly, naturally occurring smectite types, such as montmorillonite, saponite or hectorite, for example, or synthetic smectite types, such as laponites, for example, are of great importance for adjusting the rheology of the color-imparting aqueous basecoat materials. The aforementioned minerals have a negative surface charge and a positive edge charge, which positively influences the adjustment of the rheology of the basecoat materials, particularly in the case of those applications where there is a high shearing stress on the basecoat materials. However, aqueous coating materials comprising the aforementioned minerals have a tendency toward gelling, which may impair the processing properties of the aqueous basecoat materials or, where they have good processing properties, limits the level of nonvolatile material in the aqueous basecoat material.

Where there are effect pigments, especially anisotropic effect pigments, in the aqueous basecoat materials, such as aluminum flakes or mica pigments, for example, then the use of the minerals referred to above is an issue, since in the baked coating films there are often impairments of the metallic effect, particularly with regard to the flop behavior, and also with regard to luminance and clouding, in other words in connection with the development of areas of light/dark shading.

WO-A-02/053658 describes laponite-containing aqueous basecoat materials which comprise effect pigment (referred to below as aqueous effect basecoat materials) which for the purpose of preventing clouding comprise a mixture of at least two neutralized fatty acids. Although the properties of the aqueous effect basecoat materials WO-A-02/053658 describes are already excellent, there is a need, particularly in the case of aqueous metallic effect basecoat materials, to obtain an optimum combination of good rheological properties and outstanding optical properties with high fractions of nonvolatile material (solids). Particularly important in this respect is the combination of an outstanding metallic effect (flop) with a high luminance (high fraction of reflected light and low fraction of diffusely scattered light).

WO-A-2007/065861 describes hydroxides, more particularly hydrotalcite types, which contain at least 2 organic anions with at least 8 carbon atoms as counterions, it being possible for the anions to contain further functional groups, such as hydroxyl, amino or epoxide groups, for example. The hydrophobic hydrotalcites thus modified are described for use as intercalatable fillers for polymers, especially for rubberlike polymers. The use of hydrotalcites in coating compositions is described in general terms in WO-A-2007/065861. The hydrophobic hydrotalcites are of only limited suitability for use in aqueous coating compositions for OEM coat systems, since their compatibility with the preferably water-dispersible binders at the molecular level is poor. The use of the coating compositions for improving the optical properties, in particular the production of an outstanding metallic effect (flop) having a high luminance in the case of aqueous effect basecoat materials, is not described in WO-A-2007/065861.

In the light of the prior art, the problem addressed by the present invention is that of providing aqueous effect basecoat materials having a high fraction of nonvolatile constituents, which materials, in particular as basecoat film in a coating system in production-line automobile finishing, have an outstanding metallic effect (flop) having a high luminance.

SUMMARY OF THE INVENTION

Aqueous effect basecoat materials have been found, surprisingly, which solve these problems and which comprise liquid-crystalline aqueous preparations (WZ) in fractions of 1% to 99% by weight, based on the aqueous basecoat material, and at least one effect pigment, the liquid-crystalline aqueous preparations (WZ) containing preferably 10% to 99.9% by weight, based on the nonvolatile fractions of (WZ), of at least one water-dispersible polyester (PES) prepared using, in fractions of 7 to 50 mol %, based on the entirety of the polyester constituent units, difunctional monomer units (DME) having aliphatic spacer groups (SP) of 12 to 70 carbon atoms between the functional groups (Gr), and also 0.1% to 30% by weight, based on the nonvolatile fractions of (WZ), of positively charged inorganic particles (AT) in layer form, whose individual layers that are not further intercalatable have a ratio D/d of the average layer diameter (D) to the average layer thickness (d)>50 and whose charge is at least partly compensated by singly charged organic anions (OA). As a further constituent the aqueous coating composition of the invention comprises at least one film-forming, preferably water-dispersible polymer (FP), preferably a water-dispersible polyurethane (PUR), which with particular preference comprises at least one water-dispersible polyester constituent unit (PESB) with difunctional monomer units (DME).

DETAILED DESCRIPTION OF AN EMBODIMENT OF THE INVENTION

The Liquid-Crystalline Aqueous Preparation (WZ)

The aqueous effect basecoat material of the invention comprises the liquid-crystalline aqueous preparation (WZ) in fractions of 1% to 99% by weight, preferably 5% to 95% by weight, based on the aqueous effect basecoat material.

The liquid-crystalline aqueous preparation (WZ) comprises preferably 10% to 99.9%, preferably from 15 to 95%, by weight, based on the nonvolatile fractions of (WZ), of at least one water-dispersible polyester (PES), which is prepared using, in fractions of 7 to 50 mol %, based on the entirety of the polyester constituent units, difunctional monomer units (DME) having aliphatic spacer groups (SP) of 12 to 70 carbon atoms between the functional groups (Gr), and also 0.1% to 30%, preferably between 1% and 20%, by weight, based on the nonvolatile fractions of (WZ), of solid or preferably suspended positively charged inorganic particles (AT) in layer form, whose individual layers that are not further intercalatable have a ratio D/d of the average layer diameter (D) to the average layer thickness (d)>50 and whose charge is at least partly compensated by singly charged organic anions (OA).

The Water-Dispersible Polyester (PES)

The preferably liquid-crystalline aqueous preparation (WZ) comprises 10% to 99.9%, preferably from 15% to 95%, by weight, based on the nonvolatile fractions (WZ), of at least one water-dispersible polyester (PES) which is prepared using, in fractions of 7 to 50 mol %, based on the entirety of the polyester constituent units, difunctional monomer units (DME) having aliphatic spacer groups (SP) of 12 to 70 carbon atoms between the functional groups (Gr).

Water-dispersible for the purposes of the invention means that the polyesters (PES) in the aqueous phase form aggregates having an average particle diameter of <500, preferably <200, and more preferably <100 nm, or are molecularly dissolved. The size of the aggregates composed of the polyesters (PES) can be controlled in a conventional way by introducing hydrophilic groups on the polyester (PES).

The water-dispersible polyesters (PES) incorporate the groups which are capable preferably of forming anions and which, following their neutralization, ensure that the polyesters (PES) can be stably dispersed in water. Suitable groups capable of forming anions are preferably carboxylic acid groups. To neutralize the groups capable of forming anions it is preferred likewise to use ammonia, amines and/or amino alcohols, such as, for example, diethylamine and triethylamine, dimethylaminoethanolamine, diisopropanolamine, morpholines and/or N-alkylmorpholines.

The water-dispersible polyesters (PES) preferably have mass-average molecular weights Mw (determined by means of gel permeation chromatography in accordance with standards DIN 55672-1 to -3 with polystyrene as standard) of 1000 to 100 000 daltons, more preferably of 1500 to 50 000 daltons.

The difunctional monomer units (DME) of the polyesters of the invention contain aliphatic spacer groups (SP) having 12 to 70 carbon atoms between the functional groups (Gr).

Preferred aliphatic spacer groups (SP) contain 15 to 60, very preferably 18 to 50, carbon atoms. Moreover, the spacer groups (SP) may contain cycloaliphatic or aromatic structural units having 4 to 12 carbon atoms, ethylenically unsaturated structural units in fractions of up to 30 mol %, preferably of up to 25 mol %, more preferably of up to 20 mol %, based on the entirety of the carbon atoms, and also heteroatoms, such as preferably oxygen, sulfur, and/or nitrogen.

Preferred functional groups (Gr) of the monomer units (DME) are hydroxyl and/or carboxylic acid groups and/or carboxylic anhydride groups. Monomer units having in each case 2 hydroxyl groups or 2 carboxylic acid groups are particularly preferred.

Monomer units (DME) used with preference are diols and/or dicarboxylic acids and/or their anhydrides with spacer groups (SP) of 12 to 70, preferably 15 to 60, more preferably of 18 to 50 carbon atoms.

Especially preferred monomer units (DME) are dimeric fatty alcohols and/or dimeric olefinically unsaturated fatty acids and/or their hydrogenated derivatives which meet the aforementioned criteria, such as, in particular, dimeric fatty acids of the Pripol® series from Unichema.

The monomer units (DME) are used in fractions of 7 to 50 mol %, preferably of 8 to 45 mol %, more preferably of 9 to 40 mol %, based on the entirety of the constituent units of the water-dispersible polyester (PES).

As further constituent units, the water-dispersible polyester (PES) comprises preferably the following monomer units (MEn):

in fractions of 1 to 40 mol %, preferably of 2 to 35 mol %, more preferably of 5 to 30 mol %, based on the entirety of the constituent units of the water-dispersible polyester, unbranched aliphatic and/or cycloaliphatic diols (ME1) having 2 to 12 carbon atoms, such as, in particular, ethylene glycol, diethylene glycol, 1,3-propanediol, dipropylene glycol, 1,4-butanediol, 1,6-hexanediol, 1,4-cyclohexanediol and/or 1,4-dimethylolcyclohexane, more preferably 1,4-butanediol and/or 1,6-hexanediol. Unbranched for the purposes of the invention means that the aliphatic and/or cycloaliphatic carbon units contain no further aliphatic substituents;

in fractions of 1 to 50 mol %, preferably of 2 to 40 mol %, more preferably of 5 to 35 mol %, based on the entirety of the constituent units of the water-dispersible polyester, branched aliphatic and/or cycloaliphatic diols (ME2) having 4 to 12 carbon atoms, such as, in particular, neopentyl glycol, 2-methyl-2-propylpropanediol, 2-ethyl-2-butylpropanediol, 2,2,4-trimethyl-1,5-pentanediol, 2,2,5-trimethyl-1,6-hexanediol, more preferably neopentyl glycol. Branched for the purposes of the invention means that the aliphatic and/or cycloaliphatic carbon units contain further aliphatic substituents;

optionally in fractions of 0 to 30 mol %, preferably of 2 to 25 mol %, more preferably of 5 to 20 mol %, based on the entirety of the constituent units of the water-dispersible polyester, aliphatic, cycloaliphatic and/or aromatic dicarboxylic acids (ME3) having 4 to 12 carbon atoms, such as, in particular oxalic acid, malonic acid, succinic acid, glutaric acid, adipic acid, sebacic acid, maleic acid, fumaric acid, isophthalic acid, terephthalic acid, orthophthalic acid, tetrahydrophthalic acid, hexahydrophthalic acid, 1,2-cyclohexanedicarboxylic acid, 1,4-cyclohexanedicarboxylic acid and/or the anhydrides thereof, more preferably 1,2-cyclohexanedicarboxylic acid; and optionally in fractions of 0 to 40 mol %, preferably of 0 to 35 mol %, more preferably of 0 to 30 mol %, based on the entirety of the constituent units of the water-dispersible polyester, aliphatic, cycloaliphatic and/or aromatic polycarboxylic acids (ME4) having at least 3 carboxylic acid groups, such as, in particular, benzenetricarboxylic acids, such as benzene-1,2,4-tricarboxylic acid and benzene-1,3,5-tricarboxylic acid, trimellitic acid, pyromellitic acid, glyceric acid, malic acid and/or the anhydrides thereof, more preferably benzenetricarboxylic acids, such as benzene-1,2,4-tricarboxylic acid and benzene-1,3,5-tricarboxylic acid.

The reaction of the monomer units (DME), (ME1), (ME2), and also, where present, (ME3) and (ME4), takes place in accordance with the generally well-known methods of polyester chemistry. The reaction temperature is preferably at 140 to 240 degrees C., preferably at 150 to 200 degrees C. In certain cases it is appropriate to catalyze the esterification reaction, in which case examples of catalysts employed include tetraalkyl titanates, zinc alkoxylates and/or tin alkoxylates, dialkyltin oxides or organic salts of the dialkyltin oxides.

In the preferred embodiment of the invention, first of all, in a first stage, the monomer units (DME), (ME1), (ME2), and where used (ME3), are reacted with one another optionally in a suitable solvent to give a polyester polyol, which can be used per se as aqueous polyester (PES) of the invention, the molar ratio of the sum of all the diols (ME1), (ME2), and, optionally, (DME) to the sum of all the dicarboxylic acids (ME3) and, optionally, (DME) being between 3.5:1 and 1.5:1, preferably between 3:1 and 1.75:1, and more preferably between 2.5:1 and 2:1, before, optionally, in a second stage, the polyester polyol is reacted with the monomer units (ME4) to give the water-dispersible polyester (PES) of the invention. The acid number of the water-dispersible polyesters (PES) in accordance with DIN EN ISO 3682 is preferably between 10 and 80 mg KOH/g, more preferably between 20 and 60 mg KOH/g nonvolatile fraction.

In a further embodiment of the invention, the water-dispersible polyesters (PES) carry crosslinkable reactive functional groups (a), with suitability being possessed in principle by all groups which are able to react with themselves and/or with further functional groups of the polyester (PES) and/or with further constituents of the aqueous effect basecoat materials of the invention, in particular with crosslinking agents (V), to form covalent bonds. Groups of this kind are introduced via the aforementioned monomer constituent units (DME) and/or (MEn) or via further constituent units which contain such groups.

By way of example of groups (a) which react with themselves, mention may be made of the following: methylol, methylol ether, N-alkoxymethylamino, and in particular alkoxysilyl groups. Hydroxyl, amino and/or epoxy groups are preferred in particular as groups (a). Particular preference is given to hydroxyl groups, the hydroxyl number of the water-dispersible polyester (PES) in accordance with DIN EN ISO 4629 being preferably between 10 and 500, more preferably between 50 and 200 mg KOH/g nonvolatile fraction.

The Inorganic Particles (AT)

In the preferred liquid-crystalline aqueous preparation (WZ) there is 0.1% to 30%, preferably between 1% and 20%, by weight, based on the nonvolatile fractions (WZ), of solid or preferably suspended, positively charged inorganic particles (AT) that are of layer form and whose individual layers that are not further intercalatable have a ratio D/d of the average layer diameter (D) to the average layer thickness (d)>50, and whose charge is at least partly compensated by singly charged organic anions (OA). The average layer diameters (D) can be determined by way of the evaluation of SEM (Scanning Electron Microscopy) graphs, while the layer thickness (d) is determined experimentally via X-ray structural analysis, profile measurements by means of AFM (Atomic Force Microscopy) on individual platelets and also arithmetically when the molecular construction is known. The average layer diameter (D) of the positively charged inorganic particles (AT) is preferably between 100 and 1000 nm, more preferably between 200 and 500 nm; the average layer thickness (d) is preferably less than 1.0 nm, particularly preferably less than 0.75 nm.

The positively charged inorganic particles (AT) can be produced by swapping the naturally present or as-synthesized counterions (A) of the minerals in layer form for the singly charged organic anions (OA), in accordance with conventional methods, or by carrying out synthesis in the presence of the singly charged organic anions (OA). For this purpose, for example, the positively charged organic particles (AT) are suspended in a suitable liquid medium which is capable of swelling the interstices between the individual layers, and in which the organic anions (OA) are in solution, and subsequently isolated again (Langmuir 21 (2005), 8675).

When ionic exchange takes place, preferably more than 15 mol %, more preferably more than 30 mol %, of the counterions (A) from the synthesis are replaced by the singly charged organic anions (OA). Depending on the size and the spatial orientation of the organic counterions, the layer structures are generally widened, with the distance between the electrically charged layers being widened preferably by at least 0.2 nm, more preferably by at least 0.5 nm.

Preferred in accordance with the invention are positively charged inorganic particles (AT) of layer form, such as, more particularly, the mixed hydroxides of the formula:

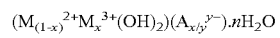

where $M^{2+}$ represents divalent cations, $M^{3+}$ represents trivalent cations, and anions (A) having a valence y as counterions, with x adopting a value of 0.05 to 0.5, and with some of the counterions (A) being replaced by the singly charged organic anions (OA).

Particularly preferred divalent cations $M^{2+}$ are calcium, zinc and/or magnesium ions, particularly preferred trivalent cations $M^{3+}$ are aluminum ions; and particularly preferred anions (A) are phosphate ions, sulfate ions and/or carbonate ions, since these ions very largely ensure that there is no change in shade when the coat of the invention is cured. The synthesis of the mixed hydroxides is known (for example, Eilji Kanezaki, Preparation of Layered Double Hydroxides, in Interface Science and Technology, Vol. 1, Chapter 12, page 345ff—Elsevier, 2004, ISBN 0-12-088439-9). The synthesis usually takes place from the mixtures of the salts of the cations in aqueous phase at defined, basic pH levels which are kept constant. The products are the mixed hydroxides, containing the anions of the metal salts as inorganic counterions (A) intercalated into the interstices. Where the synthesis takes place in the presence of carbon dioxide, the product is generally the mixed hydroxide with intercalated carbonate ions (A). If the synthesis is carried out in the absence of carbon dioxide and/or carbonate, in the presence of singly charged organic anions (OA) or their acidic precursors, the product is generally the mixed hydroxide having organic anions (OA) intercalated into the interstices (coprecipitation method or template method). An alternative synthesis route for the preparation of the mixed hydroxides is the hydrolysis of the metal alkoxides in the presence of the desired anions to be intercalated (U.S. Pat. No. 6,514,473). It is possible, moreover, to introduce the singly charged organic anions (OA) for intercalation by means of ion exchange on mixed hydroxides with intercalated carbonate ions (A). This can be done, for example, by rehydrating the amorphous calcined mixed oxide in the presence of the desired anions (OA) for intercalation. Calcining the mixed hydroxide containing intercalated carbonate ions (A) at temperatures <800° C. yields the amorphous mixed oxide, with retention of the layer structures (rehydration method).

Alternatively the ion exchange may take place in an aqueous or aqueous-alcoholic medium in the presence of the acidic precursors of the organic anions to be intercalated. In this case, depending on the acid strength of the precursors of the singly charged organic anions (OA) for intercalation, treatment with dilute mineral acids is needed in order to remove the carbonate ions (A).

The charge carriers of the singly charged organic anions (OA) that are used for at least partial compensation of the charge and for widening the aforementioned mixed hydroxides are anionic groups (AG), such as, with particular preference, singly charged anions of carboxylic acid, of sulfonic acid and/or of phosphonic acid. The singly charged organic anions (OA) preferably have molecular weights of <1000 daltons, more preferably <500 daltons.

In a further embodiment of the invention the singly charged organic anions (OA) additionally carry functional groups (c) which, when the coating composition is cured, react, where appropriate, with functional groups (a) of the polymer (FP) to form covalent bonds. Particular preference is given to the functional groups (c) selected from the group of hydroxyl, epoxy and/or amino groups.

The functional groups (c) are separated from the anionic groups (AG) of the singly charged organic anions (OA) preferably by a spacer, the spacer being selected from the group of the optionally substituted aliphatics and/or cycloaliphatics which are optionally modified with heteroatoms, such as nitrogen, oxygen and/or sulfur, and have a total of 2 to 30 carbon atoms, preferably between 3 and 20 carbon atoms, of the optionally substituted aromatics which are optionally modified with heteroatoms, such as nitrogen, oxygen and/or sulfur, and have a total of 2 to 20 carbon atoms, preferably between 3 and 18 carbon atoms, and/or of the substructures of the above-recited cycloaliphatics and aromatics, the substructures containing in particular at least 3 carbon atoms and/or heteroatoms between the functional group (c) and the anionic group (AG).

With particular preference the spacers of the singly charged organic anions (OA) are optionally substituted phenyl or cyclohexyl radicals which contain the functional group (c) in m- or p-position in relation to the anionic group (AG). Use is made in particular here of hydroxyl and/or amino groups as functional group (c) and of carboxylate and/or sulfonate groups as anionic group (AG). In a further embodiment of the invention the organic anions (OA) contain at least two of the above-recited functional groups (c).

Especially preferred as singly charged organic anions (OA) with a functional group (c) are the following:

m- or p-aminobenzenesulfonate, m- or p-hydroxybenzenesulfonate, m- or p-aminobenzoate and/or m- or p-hydroxybenzoate;

and especially preferred as singly charged organic anions (OA) having two functional groups (c) are the following:

3-hydroxy-4-aminobenzenesulfonate, 3-amino-4-hydroxybenzenesulfonate, 3-hydroxy-4-aminobenzoate and/or 3-amino-4-hydroxybenzoate.

In the case of the abovementioned particularly preferred mixed hydroxides which by virtue of their synthesis contain preferably carbonate as anion (A), the ion exchange replaces preferably more than 15 mol %, more preferably more than 30 mol %, of the anions (A) by the singly charged organic anions (OA).

The modification of the cationically charged inorganic particles (AT) is preferably carried out in a separate process prior to incorporation into the coating composition of the invention, this process being carried out with particular preference in an aqueous medium. The electrically charged inorganic particles (AT) modified with the singly charged organic anions (OA) are preferably prepared in one synthesis step. The particles prepared in this way have only a very slight inherent color, and preferably are colorless.

The positively charged particles (AT) modified with singly charged organic anions (OA) can be prepared in one synthesis step in particular from the metal salts of the cations and from the organic anions. In that case, preferably, an aqueous mixture of salts of the divalent cations $M^{2+}$ and of the trivalent cations $M^{3+}$ is introduced into an aqueous alkaline solution of the singly charged organic anion (OA) until the desired stoichiometry is established. The addition takes place preferably in a $CO_2$-free atmosphere, preferably under an inert gas atmosphere, as for example under nitrogen, with stirring at temperatures between 10 and 100 degrees C., preferably at room temperature, with the pH of the aqueous reaction mixture being maintained in the range from 8 to 12, preferably between 9 and 11, preferably by addition of alkaline hydroxides, more preferably NaOH. Following addition of the aqueous mixture of the metal salts, the resulting suspension is aged at the aforementioned temperatures for a period of 0.1 to 10 days, preferably 3 to 24 hours, and the resulting precipitate is isolated, preferably by centrifuging, and washed repeatedly with deionized water. Thereafter, from the purified precipitate, a suspension is established, using water, of the positively charged particles (AT) modified with the singly charged organic anions (OA) with a solids content of 5% to 50%, preferably of 10 to 40%, by weight.

The thus-prepared suspensions of the modified, positively charged inorganic particles (AT) can be incorporated in principle during any phase of the process of the invention for producing the coating composition—that is, before, during and/or after the addition of the other components of the coating composition.

The crystallinity of the resulting doubled mixed hydroxides in layer form as modified positively charged inorganic particles (AT), which are generally obtained not as individual layers but rather as layer stacks and are used in that form, is dependent on the selected synthesis parameters, on the nature of the cations employed, on the ratio of the $M^{2+}/M^{3+}$ cations, and on the nature and the amount of the anions employed, and ought to adopt values which are as large as possible.

The crystallinity of the mixed hydroxide phase can be expressed as the calculated size of the coherent scattering domains from the analysis of the corresponding X-ray diffraction lines, examples being the [003] and [110] reflections in the case of the Mg—Al-based mixed doubled hydroxide. Thus, for example, Eliseev et al. show the effect of thermal aging on the growth of the domain size of the Mg—Al-based mixed doubled hydroxide investigated, and explain this by the progressive incorporation of extant tetrahedrally coordinated aluminum into the mixed hydroxide layer in the form of octahedrally coordinated aluminum, shown via the relative intensities of the corresponding signals in the $^{27}$Al NMR spectrum (Doklady Chemistry 387 (2002), 777).

Further Constituents of the Liquid-Crystalline Aqueous Preparations (WZ)

The liquid-crystalline aqueous preparation (WZ) may further comprise customary coatings additives in effective amounts. Thus, in the liquid-crystalline aqueous preparations (WZ), in addition to the preferred inorganic particles (AT), the preferred polyesters (PES), and the film-forming polymers (FP), more particularly the water-dispersible polyurethanes (PUR), there may in particular be water-miscible or water-soluble solvents present in fractions of up to 40%, preferably of up to 30%, more preferably of up to 20%, by weight, based on the nonvolatile fractions of (WZ). Further examples of suitable coatings additives are described in, for example, the textbook "Lackadditive" [Additives for Coatings] by Johan Bieleman, Verlag Wiley-VCH, Weinheim, N.Y., 1998.

The Preparation of the Liquid-Crystalline Aqueous Preparations (WZ)

The liquid-crystalline aqueous preparations (WZ) are preferably prepared by first mixing all of the constituents of the preparation apart from the modified, electrically charged inorganic particles (AT). The modified, positively charged inorganic particles (AT) or, preferably, the suspension of the modified electrically charged inorganic particles (AT) prepared preferably by the above-recited process are introduced with stirring into the resulting mixture, preferably until the suspension is uniformly dispersed, something which can be monitored by optical methods, more particularly by visual inspection.

The resulting mixture is treated preferably at temperatures between 10 and 50 degrees C., preferably at room temperature, for a period of 2 to 30 minutes, preferably of 5 to 20 minutes, with stirring and ultrasound for obtaining a more finely divided, more homogeneous dispersion of the preparation of the inorganic particles AT; in one particularly preferred embodiment, the tip of an ultrasound source is immersed into the mixture. During the ultrasound treatment the temperature of the mixture may rise by 10 to 60 K. The dispersion thus obtained is aged preferably for at least 12 hours with stirring at room temperature. Thereafter, the dispersion is adjusted preferably with water to a solids content of 10 to 70%, preferably 15 to 60%, by weight.

The Properties of the Liquid-Crystalline Aqueous Preparations (WZ)

The preparations (WZ) have liquid-crystalline properties. In particular, under crossed polarizers, they display a birefringent phase, which depending on the concentration of the component (AT) of the invention may be present alongside an isotropic phase. The texture of the birefringent phase is a close match to the textures of the kind ascribed to nematic phases.

By means of ultra-small-angle X-ray scattering on the aqueous preparations of the invention, and also by means of scanning electron microscopy imaging of cryogenic fracture samples (cryo-SEM), it is possible to image the typical lamellar layer structures, and to characterize them in terms of their average interplanar spacings from the 1st-order intensity maxima.

The Film-Forming Water-Dispersible Polymer (FP)

Besides the liquid-crystalline aqueous preparation (WZ), as a further constituent, the aqueous effect basecoat material of the invention comprises preferably 5% to 80%, more preferably 10% to 60%, by weight, based on the nonvolatile fractions of the aqueous effect basecoat material, of a water-dispersible, film-forming polymer (FP). Water-dispersible, film-forming polymers of this kind are described for example in WO-A-02/053658; in the present invention it is preferred to employ film-forming polymers (FP) from the group of the water-dispersible polyesters, which differ from the above-described polyesters (PES), of the water-dispersible polyacrylates, of the water-dispersible polyurethanes and/or of the water-dispersible acrylated polyurethanes.

In one preferred embodiment of the invention the water-dispersible film-forming polymer (FP) comprises at least one water-dispersible polyurethane (PUR) which with particular preference comprises at least one polyester constituent unit (PESB) with the above-described difunctional monomer units (DME) in fractions of 1 to 40 mol %, preferably of 2 to 35 mol %, more preferably of 5 to 30 mol %, based on the entirety of the constituent units of the polyester constituent unit (PESB).

Water-dispersible for the purposes of the invention means that the polyurethane (PUR) in the aqueous phase forms aggregates having an average particle diameter of <500, preferably <200 and more preferably <100 nm or is in molecularly disperse solution. The size of the aggregates composed of the polyurethane (PUR) can be controlled in conventional manner by introduction of hydrophilic groups on the polyurethane (PUR).

The water-dispersible polyurethane (PUR) incorporates the groups which are capable preferably of forming anions and which, after their neutralization, ensure that the polyurethane (PUR) can be stably dispersed in water. Suitable groups capable of forming anions are preferably carboxylic acid groups. To neutralize the groups capable of forming anions it is likewise preferred to use ammonia, amines, and/or amino alcohols, such as diethylamine and triethylamine, dimethylaminoethanolamine, diisopropanolamine, morpholines and/or N-alkylmorpholines, for example.

The difunctional monomer units (DME) of the polyester constituent unit (PESB) of the polyurethane (PUR) contain aliphatic spacer groups (SP) having 12 to 70 carbon atoms between the functional groups (Gr). Preferred spacer groups (SP) and monomer units (DME) of the polyester constituent unit (PESB) are set out in the description of the water-dispersible polyester (PES).

Very particularly preferred monomer units (DME) of the polyester constituent unit (PESB) are dimeric fatty alcohols and/or dimeric olefinically unsaturated fatty acids and/or their hydrogenated derivatives, which satisfy the aforementioned criteria, such as, in particular, dimeric fatty acids of the Pripol® series from Unichema.

As further constituent units, the preferred polyester constituent unit (PESB) of the polyurethane (PUR), where appropriate in addition to further monomer units, comprises preferably the following monomer units (MEnn):

In fractions of 1 to 80 mol %, preferably of 2 to 75 mol %, more preferably of 5 to 70 mol %, based on the entirety of the constituent units of the polyester constituent unit (PESB), unbranched aliphatic and/or cycloaliphatic diols (ME11) having 2 to 12 carbon atoms, such as, in particular, ethylene glycol, diethylene glycol, 1,3-propanediol, dipropylene glycol, 1,4-butanediol, 1,6 hexanediol, 1,4-cyclohexanediol and/or 1,4-dimethylolcyclohexane, more preferably 1,4-butanediol and/or 1,6-hexanediol. Unbranched for the purposes of the invention means that the aliphatic and/or cycloaliphatic carbon units contain no further aliphatic substituents.

In fractions of 1 to 40 mol %, preferably of 2 to 35 mol %, more preferably of 5 to 30 mol %, based on the entirety of the constituent units of the polyester constituent unit (PESB), aliphatic, cycloaliphatic and/or aromatic dicarboxylic acids (ME22) having 4 to 12 carbon atoms, such as in particular, oxalic acid, malonic acid, succinic acid, glutaric acid, adipic acid, sebacic acid, maleic acid, fumaric acid, isophthalic acid, terephthalic acid, orthophthalic acid, tetrahydrophthalic acid, hexahydrophthalic acid, 1,2-cyclohexanedicarboxylic acid, 1,4-cyclohexanedicarboxylic acid, and/or the anhydrides thereof, more preferably isophthalic acid.

The reaction of the monomer units (DME), (ME11), (ME22) and, where appropriate, further monomer units takes place in accordance with the generally well-known methods of polyester chemistry. The reaction temperature is preferably at 140 to 240 degrees C., preferably at 150 to 200 degrees C. In certain cases it is appropriate to catalyze the esterification reaction, examples of catalysts employed being tetraalkyl titanates, zinc alkoxylates and tin alkoxylates, dialkyltin oxides or organic salts of the dialkyltin oxides.

The water-dispersible polyurethanes (PUR) are synthesized preferably from the polyester constituent units (PESB) and also, where appropriate, further polyols of low molecular mass and/or higher molecular mass, having at least 2 hydroxyl groups per polyol unit, which are reacted preferably with bisisocyanato compounds and/or mixtures thereof and/or their dimeric, trimeric or tetrameric adducts, such as, in particular, biurets or isocyanurates, such as, preferably, hexamethylene diisocyanate, isophorone diisocyanate, TMXDI, 4,4'-methylenebis(cyclohexyl isocyanate), 4,4'-methylenebis(phenyl isocyanate), 1,3-bis(1-isocyanato-1-methylethyl)benzene, more preferably hexamethylene diisocyanate and/or isophorone diisocyanate, and compounds capable of forming anions, such as, in particular, 2,2-bis-(hydroxymethyl)propionic acid, to form the polyurethane. The polyurethanes (PUR) are preferably of branched construction as a result of the proportional use of polyols, preferably triols, more preferably 1,1,1-tris(hydroxymethyl)-propane.

The water-dispersibility of the polyurethanes is achieved through neutralization of the groups capable of forming anions, preferably with amines, more preferably with diethanolamine, with preference being given to a degree of neutralization of between 80 and 100%, based on the entirety of the neutralizable groups.

In a further embodiment of the invention the film-forming polymers (FP), in particular the water-dispersible polyurethanes (PUR) carry crosslinkable functional groups (a) as already described for the water-dispersible polyesters (PES). Particular preference is given to hydroxyl groups, the hydroxyl number of the film-forming polymers (FP) in accordance with DIN EN ISO 4629 being preferably between 0 and 200, more preferably between 0 and 100 mg KOH/g nonvolatile fraction, and in particular the hydroxyl number of the water-dispersible polyurethane (PUR) in accordance with DIN EN ISO 4629 being preferably between 0 and 50, more preferably between 0 and 30 mg KOH/g nonvolatile fraction.

The Effect Pigments (EP) of the Aqueous Effect Basecoat Material

By effect pigments (EP) are meant all pigments which endow a surface coating with specific decorative effects. The effect pigments (EP) are, for example, all of the effect-imparting pigments which can typically be employed in motor-vehicle and industrial finishing or in the production of inks and colorants.

Examples of such effect pigments (EP) are pure metal pigments such as, for example, aluminum, iron or copper pigments, interference pigments such as, for example, titanium dioxide-coated mica, iron oxide-coated mica, mixed oxide-coated mica, metal oxide-coated mica, or liquid-crystal pigments.

Preferred effect pigments (EP) in accordance with the invention are platelet-shaped metal pigments, preferably aluminum pigments, such as, more particularly, leafing or nonleafing pigments (in this regard compare BASF Handbuch Lackiertechnik, pages 164ff, Vincentz-Verlag, Hannover, 2002), and/or mica pigments, interference pigments and pearlescent pigments (in this regard compare BASF Handbuch Lackiertechnik, pages 165ff, Vincentz-Verlag, Hannover, 2002).

The amount of the effect pigments (EP) in the aqueous effect basecoat material of the invention may vary widely and is guided on the one hand by the opacity of the effect pigment (EP) and by the intensity of the optical effect it is desired to obtain. The aqueous effect basecoat material of the invention contains preferably 0.1% to 50% by weight, based on the nonvolatile constituents of the aqueous effect basecoat material, more preferably 0.5% to 40% by weight, very preferably 1% to 30% by weight, and with very particular preference 2% to 25% by weight of effect pigment (EP) or of mixtures of different effect pigments (EP).

Further Constituents of the Aqueous Effect Basecoat Material

Furthermore, the aqueous basecoat material of the invention may contain crosslinking agents (V), which have at least two functional groups (b) which, as complementary groups, react with the functional groups (a) of the polyester (PES) and/or of the film-forming polymer (FP), in particular of the polyurethane (PUR), when the coating composition is cured, to form covalent bonds.

Preference is given to functional complementary groups (b) in the crosslinking agent (V) that react with the particularly preferred hydroxyl groups as functional groups (a), with (b) being selected preferably from the group of the optionally block polyisocyanate groups and/or of the methylol groups, which where appropriate are partly or fully etherified with alcohols. Examples of suitable polyisocyanates and of suitable components containing methylol groups are described for example in EP-A-1 192 200.

Furthermore, the aqueous preparation of the invention may further comprise customary coatings additives in effective amounts. Thus, for example, further color pigments, and also customary fillers, in known amounts, may be part of the coating composition. The pigments and/or fillers may consist of organic or inorganic compounds and are set out by way of example in EP-A-1 192 200. Further additives which can be used are, for example, further binders, such as polyurethanes or polyacrylates, for example, more particularly polyurethanes, UV absorbers, free-radical scavengers, slip additives, polymerization inhibitors, defoamers, emulsifiers, wetting agents, flow control agents, film-forming auxiliaries, rheology control additives, and, preferably, catalysts for the reaction of the functional groups (a), (b) and/or groups (c), and additional crosslinking agents for the functional groups (a), (b) and/or (c). Further examples of suitable coatings additives are described for example in the textbook "Lackadditive" [Additives for Coatings] by Johan Bieleman, Wiley-VCH, Weinheim, N.Y., 1998.

The Preparation and Application of the Aqueous Effect Basecoat Material of the Invention, and the Characterization of the Resulting Basecoat Films The aqueous effect basecoat material of the invention can be prepared by all of the processes that are known and customary in the coatings field, in suitable mixing assemblies, such as stirred tanks, dissolvers or Ultraturrax. Preferably the aqueous preparation (WZ) is introduced to start with and the film-forming water-dispersible polymer (FP), the effect pigment (EP) and, where appropriate, the above-described further constituents are added with stirring. The aqueous effect basecoat material of the invention is preferably adjusted with water to a solids content of preferably 5% to 50%, more preferably of 10% to 45%, more particularly of 20% to 40%, by weight.

The resulting aqueous effect basecoat material of the invention, in particular the precursor composed of a mixture of the aqueous preparation (WZ) and the film-forming polymer (FP) before addition of the effect pigment (EP), preferably likewise has liquid-crystalline properties.

In order to form the basecoat films, the aqueous effect basecoat materials of the invention are applied preferably in a wet film thickness such that, after thermal treatment to remove the volatile constituents, in the resulting coats, a dry coat thickness of between 5 and 50 µm, preferably between 6 and 40 µm, more preferably between 7 and 30 µm, in particular between 8 and 25 µm is present.

The application of the aqueous effect basecoat materials of the invention may take place by customary application methods, such as spraying, knife coating, spreading, pouring, dipping or rolling, for example. Where spray application methods are employed, preference is given to compressed air spraying, airless spraying, high-speed rotational spraying, and electrostatic spray application (ESTA).

The application of the aqueous effect basecoat materials of the invention is carried out in general at temperatures of not more than 70 to 80 degrees C., and so suitable application viscosities can be attained without the brief thermal exposure being accompanied by change or damage to the coating composition or to its overspray, which if appropriate may be reprocessed.

The preferred thermal treatment of the applied film of the aqueous effect basecoat material of the invention takes place by the known methods, such as, for example, by heating in a forced air oven or by irradiation with infrared lamps. Advantageously the thermal cure takes place at temperatures between 80 and 180 degrees C., preferably between 100 and 160 degrees C., for a time of between 1 minute and 2 hours, preferably between 2 minutes and 1 hour, more preferably between 10 and 45 minutes. Where substrates are used, such as metals, for example, which have the capacity to withstand a high thermal load, the thermal treatment may also be carried out at temperatures above 180 degrees C. Generally speaking, however, it is advisable not to exceed temperatures of 160 to 180 degrees C. Where, on the other hand, substrates such as plastics, for example, are used which have a maximum limit to their ability to withstand thermal loads, the temperature and the time needed for the curing operation must be brought into line with this maximum limit. The thermal cure may take place after a certain rest time of 30 seconds to 2 hours, preferably of 1 minute to 1 hour, more particularly of 2 to 30 minutes. The rest time serves in particular for the flow and the degassing of the applied basecoat films or for the evaporation of volatile constituents, such as solvents or water. The rest time may be assisted and shortened through the application of elevated temperatures of up to 80 degrees C., provided this is not accompanied by any damage or change to the applied films, such as premature complete crosslinking, for instance.

The aqueous effect basecoat material of the invention is suitable for numerous applications in the fields of automotive OEM finishing, automotive refinishing, and industrial finishing, more particularly metal strip coating (coil coating).

The aqueous effect basecoat material of the invention is preferably used as basecoat film in OEM coat systems on metallic substrates and/or plastics substrates, which, in the case of metal substrates, consist, as viewed from the substrate, of an electrolytically deposited corrosion protection coat, preferably a cathodically deposited coat, of a surfacer coat applied thereto, and of a topcoat applied to the surfacer coat, the topcoat being composed preferably of the aqueous effect basecoat material of the invention and a concluding clearcoat material.

In this case, it is preferred for the electrocoat material, more particularly the cathodic coating material, to be cured before the surfacer is applied. In a subsequent step, the surfacer is applied and the surfacer coat formed is preferably cured. After that, first of all the aqueous effect basecoat material of the invention and, to conclude, a clearcoat material are applied in two further stages. In that case, in a preferred process, in a first step the aqueous effect basecoat material of the invention is applied, and flashed off for a time of between 1 to 30 minutes, preferably between 2 and 25 minutes, at temperatures between 20 and 90 degrees C., preferably between room temperature and 85 degrees C., and it is overcoated in a subsequent step with a clearcoat material, preferably a two-component clearcoat material, and basecoat and clearcoat are jointly cured.

In a further embodiment of the invention, the surfacer coat is flashed off, prior to application of the film of the aqueous effect basecoat material of the invention, for a time of between 1 to 30 minutes, preferably between 2 and 20 minutes, at temperatures between 40 and 90 degrees C., preferably between 50 and 85 degrees C. Thereafter, surfacer coat, basecoat film, and clearcoat film are jointly cured.

The OEM coat systems produced in this way exhibit a significantly increased angle-dependent reflection behavior (luminance) of the basecoat in comparison to OEM coat systems with smectite-containing basecoats. This luminance L* is determined in an angle-dependent manner using a spectrophotometer. The ratio of the luminance at a low observation angle to the luminance at a high observation angle (flop) exhibits values which correspond to the excellent values of the smectite-containing basecoats. In addition to these outstanding properties, the coatings produced with the aqueous effect basecoat materials of the invention exhibit excellent condensation resistance, excellent adhesion to the surfacer coat and more particularly to the clearcoat film, and excellent stability of the inherent color after curing. Moreover, with the aqueous effect basecoat material of the invention, coatings can be realized that have a comparatively low baking temperature and a good topcoat appearance.

The examples which follow are intended to illustrate the invention.

EXAMPLES

Example 1

Synthesis of an Aqueous Dispersion of an Inventive Polyester (PES)

A reactor with anchor stirrer, nitrogen inlet, reflux condenser, and distillation bridge is charged with 10.511 g of 1,6-hexanediol, 9.977 g of 2,2-dimethyl-1,3-propanediol, 6.329 g of cyclohexane-1,2-dicarboxylic anhydride, 23.410 g of dimeric fatty acid (Pripol®1012, Unichema, dimer content at least 97% by weight, trimer content not more than 1% by weight, monomer content not more than traces), and 0.806 g of cyclohexane. The contents of the reactor are heated at 220 degrees C. in a nitrogen atmosphere and with stirring until the reaction mixture has an acid number to DIN EN ISO 3682 of 8 to 12 mg KOH/g nonvolatile fraction and a viscosity of 3.7 to 4.2 dPas (measured as an 80% by weight solution of the reaction mixture in 2-butoxyethanol at 23 degrees C. in an ICI cone/plate viscometer). Thereafter the cyclohexane is distilled off and the reaction mixture is cooled to 160 degrees C.

After that, the reaction mixture is admixed with 10.511 g of 1,2,4-benzenetricarboxylic anhydride, heated to 160 degrees C., and maintained at that temperature until the resulting polyester has an acid number to DIN EN ISO 3682 of 38 mg KOH/g nonvolatile fraction, a hydroxyl number to DIN EN ISO 4629 of 81 mg KOH/g nonvolatile fraction, a weight-average molecular weight Mw of about 19 000 daltons (determined by means of gel permeation chromatography in accordance with DIN standards 55672-1 to -3 with polystyrene as standard), and a viscosity of 5.0 to 5.5 dPas (measured as a 50% by weight solution of the reaction mixture in 2-butoxyethanol at 23 degrees C. in an ICI cone/plate viscometer).

The reaction mixture is cooled to 130 degrees C. and 2.369 g of N,N-dimethylamino-2-ethanol are added. After further cooling to 95 degrees C., 17.041 g of deionized water and 19.046 g of 2-butoxyethanol are added. The resulting dispersion is adjusted by addition of further N,N-dimethylamino-2-ethanol and deionized water to a pH of 7.4 to 7.8 and to a nonvolatile fraction of 60% by weight.

Example 2

Synthesis of an Aqueous Dispersion of an Inventive Polyurethane (PUR)

A reactor with anchor stirrer, nitrogen inlet, reflux condenser, and distillation bridge is charged with 30 g of 1,6-hexanediol, 16 g of benzene-1,3-dicarboxylic acid, 54 g of oligomeric fatty acid (Pripol®1012, Uniqema, dimer content at least 97% by weight, trimer content not more than 1% by weight, monomer content not more than traces) and 0.9 g of xylene. The contents of the reactor are heated at 230 degrees C. in a nitrogen atmosphere and with stirring until the reaction mixture has an acid number to DIN EN ISO 3682 of less than 4 mg KOH/g nonvolatile fraction and a viscosity of 11 to 17 dPas (measured at 50 degrees C. in an ICI cone/plate viscometer). The resulting polyester solution has a nonvolatile fraction of 73% by weight.

A further reactor with anchor stirrer, nitrogen inlet, reflux condenser, and distillation bridge is charged with 21.007 g of the above-described polyester solution, 0.205 g of 2,2-dimethyl-1,3-propanediol, 1.252 g of 2,2-bis-(hydroxymethyl)propionic acid, 5.745 g of 2-butanone and 5.745 g of 3-iso-cyanatomethyl-3,3,5-trimethylcyclohexylisocyanate. The contents of the reactor are heated at 82 degrees C. in a nitrogen atmosphere and with stirring until the reaction mixture, in the form of a 2:1 dilution in N-methylpyrrolidone, has an isocyanate content of 0.8 to 1.1% by weight and a viscosity of 5 to 7 dPas (measured at 23 degrees C. in an ICI cone/plate viscometer). Thereafter the reaction mixtures is admixed with 0.554 g of 1,1,1-tris-(hydroxymethyl)propane, heated to 82 degrees C., and held at that temperature until the reaction mixture, in the form of a 1:1 dilution in N-methylpyrrolidone, has an isocyanate content of less than 0.3% by weight and a viscosity of 12 to 13 dPas (measured at 23 degrees C. in an ICI cone/plate viscometer).

The reaction mixture is diluted with 5.365 g of 2-butoxyethanol, and admixed with 0.639 g of N,N-dimethylamino-2-ethanol. The resulting mixture is introduced into 60 g of deionized water, the temperature being held at 80 degrees C. Thereafter the 2-butoxyethanol is removed by distillation down to a residual level of less than 0.25% by weight, based on the reaction mixture. The resulting dispersion is adjusted by addition of further N,N-dimethylamino-2-ethanol and deionized water to a pH of 7.2 to 7.4 and a nonvolatile fraction of 27% by weight.

Example 3

Synthesis and Modification of Hydrotalcite

A 0.21 molar aqueous solution of 4-aminobenzenesulfonic acid (4-absa) is admixed over 3 hours with an aqueous mixture of $ZnCl_2.6H_2O$ (0.52 molar) and $AlCl_3.6H_2O$ (0.26 molar) at room temperature under a nitrogen atmosphere and with continual stirring. The pH is held constant at 9 by addition of a 3 molar NaOH solution.

Following addition of the aqueous mixture of the metal salts, the resulting suspension is aged at room temperature for 3 hours. The resulting precipitate is isolated by centrifuging and washed 4 times with deionized water.

The resulting suspension of the white reaction product $Zn_2Al(OH)_6(4-absa).2H_2O$ (LDH suspension) has a solids content of 27.1% by weight and a pH of 9.

Example 4

Formulation of the Precursor for the Inventive Aqueous Effect Basecoat Material

To prepare the liquid-crystalline aqueous preparation (WZ), 13.5 g of the hydrotalcite suspension prepared in Preparation Example 3 are introduced with stirring at room temperature into a mixture of 15.0 g of the aqueous polyester dispersion (PES) from Preparation Example 1, which has been diluted with 9.0 g of deionized water, and the mixture is stirred for 12 hours. This produces a viscous white dispersion which has streaks of the kind frequently observed in liquid-crystalline preparations.

Under crossed polarizers it is possible to perceive a nematic, liquid-crystalline, birefringent phase alongside an isotropic, nonbirefringent phase. Ultra-small-angle X-ray scattering shows an intensity maximum of the kind typical of lamellar structures. The 1st-order intensity maximum for a scattering vector q~0.085 [1/nm] (for radiation with a wavelength $\lambda$=1.38 nm, measured at the synchrotron radiation laboratory HASYLAB, DORIS, BW4, DESY, Hamburg), corresponds to an interlayer spacing of 75 nm.

Thereafter the liquid-crystalline aqueous preparation (WZ) is admixed with 85.0 g of the aqueous polyurethane dispersion (PUR) from Preparation Example 2 as a film-forming polymer (FP), with stirring. The result is a storage-stable, milky dispersion of low viscosity which, based in each case on the dispersion, contains 7.4% by weight of polyester (PES), 18.7% by weight of polyurethane (PUR), 6.4% by weight of 2-butoxyethanol, and 3.0% by weight of hydrotalcite.

Small-angle X-ray scattering shows intensity maxima of the kind typical of lamellar structures. The 1st-order intensity maximum with a scattering vector q~0.30 [1/nm] (for CuK$\alpha$ radiation with a wavelength $\lambda$=0.154 nm) corresponds to an interlayer spacing of 21 nm. Under crossed polarizers, no birefringent phase can be seen. After a heating phase (5 minutes at 100 degrees C.) of the covered film of liquid, the phase which is still always homogeneous has an increased intensity under identical settings of the crossed polarization filters and also of the exposure parameters.

Example 5 (Comparative Example)

Preparation of a PES/PUR Dispersion with Smectite Component 15.0 g of the aqueous polyester dispersion (PES) from Preparation Example 1 are mixed with 85.0 g of the aqueous polyurethane dispersion (PUR) from Preparation Example 2, with stirring. Thereafter 20.0 g of a mixture of 3% by weight, based on the mixture, of a synthetic smectite compound (Laponite 0 RD from LaPorte) and 3% by weight, based on the mixture, of a polypropylene glycol (Pluriol P600 from BASF SE) are added, with stirring. The result is a clear, unstructured dispersion.

Examples 6 and 7 (Comparative Example)

Preparation of the Aqueous Effect Pigment Basecoat Materials, their Application and their Properties To prepare the aqueous effect basecoat materials of Example 6 (inventive) and Example 7 (comparative), 5.0 g of a mica pigment coated with titanium dioxide (Exterior Mearlin Fine Pearl from BASF SE) are incorporated with stirring into the preparation (WZ) of Example 4 and into the dispersion of Example 5 (comparative example).

To produce the samples with an OEM coat system, pretreated steel panels provided with a cathodic electrodeposition coating, from Chemetall, are used (steel panel thickness: 750 μm, cathodic electrocoat thickness 21+/−2 μm). These steel panels are coated with a commercial black surfacer (FU 43-9000 from BASF Coatings AG) and cured at 145 degrees C. for 20 minutes. The dry film thickness of the resulting surfacer coat is 25+/−2 μm.

Applied by automatic spray application to the steel panels coated with the black surfacer are the aqueous effect basecoat materials of Example 6 (inventive) and of Example 7 (comparative), using a spraying apparatus from Köhne. The resulting aqueous basecoat films are flashed off at room temperature for 10 minutes and subsequently dried at 80 degrees C. for 10 minutes. The dry film thickness of the resulting aqueous basecoat is 20+/−5 μm.

Applied by spray application atop the steel panels coated with the aqueous basecoats is a commercial 2-component clearcoat material (FF99-0140 and SC29-0199 from BASF Coatings AG). The resulting clearcoat film is dried at room temperature for 10 minutes. It is subsequently cured at 140 degrees C. for 20 minutes. The dry film thickness of the resulting clearcoat is 45+/−5 μm.

The steel panels coated in this way are subjected to spectrophotometer determination (MA 68 II from X-Rite) in an angle-dependent procedure at 5 observation angles to give the luminances $L1^*$ to $L5^*$, as set out in Table 1 below.

TABLE 1

Luminance values $Ln^*$ for the coats of the inventive aqueous effect basecoat material according to Example 6 and of the aqueous effect basecoat material according to Example 7 (comparative)

| Angle (degrees) | Coating | |
|---|---|---|
| | from Example 6 Aqueous effect basecoat from Example 4 Luminance ($L^*$) | from Example 7 (comparative) Aqueous effect basecoat from Example 5 (comparative) Luminance ($L^*$) |
| 15 | 101.8 | 90.7 |
| 25 | 84.6 | 72.4 |
| 45 | 57.7 | 48.0 |
| 75 | 42.6 | 35.1 |
| 115 | 38.6 | 31.6 |

The measurement data show a significantly enhanced luminance on the part of the systems with a layer of the inventive aqueous effect basecoat material as per Example 6 by comparison with those featuring a layer of smectite-containing aqueous basecoat of the prior art as per Example 7. In regard of flop effect, the ratio $L^*5/L^*1$ of the luminance values $L5^*$ (at an angle of 115 degrees) to $L1^*$ (at an angle of 15 degrees), the aqueous effect basecoat of the invention, from Example 6, is an equal match for the prior-art, smectite-containing aqueous basecoat from Example 7.

What is claimed is:

1. An aqueous effect basecoat material comprising
    at least one liquid-crystalline aqueous preparation (WZ) in fractions of 1% to 99% by weight, based on the aqueous effect basecoat material,
    at least one film-forming polymer (FP), and
    at least one effect pigment (EP);
    wherein the liquid-crystalline aqueous preparation (WZ) comprises:
        10% to 99.9% by weight, based on the nonvolatile fractions of the aqueous preparation (WZ), of at least one water-dispersible polyester (PES) which is prepared using, in fractions of 7 to 50 mol %, based on the entirety of the polyester constituent units, difunctional monomer units (DME) having aliphatic spacer groups (SP) of 12 to 70 carbon atoms between the functional groups (Gr),
    and also
        0.1% to 30% by weight, based on the nonvolatile fractions of the aqueous preparation (WZ), of positively charged inorganic particles (AT) in layer form, whose individual layers that are not further intercalatable have a ratio D/d of an average layer diameter (D) to an average layer thickness (d) >50 and whose charge is at least partly compensated by singly charged organic anions (OA);
    wherein upon formation of a basecoat film from the aqueous effect basecoat material is effective to provide flop and luminance.

2. The aqueous effect basecoat material of claim 1, wherein the liquid-crystalline aqueous preparation (WZ) exhibits a birefringent phase.

3. The aqueous effect basecoat material of claim 1, wherein the water-dispersible polyester (PES) comprises, in addition to the monomer units (DME), as further constituent units:
    (ME1): 1 to 40 mol %, based on the entirety of the constituent units of the water-dispersible polyester (PES), unbranched aliphatic and/or cycloaliphatic diols having 2 to 12 carbon atoms, (ME2): 1 to 50 mol %, based on the entirety of the constituent units of the water-dispersible polyester (PES), of branched aliphatic and/or cycloaliphatic diols having 4 to 12 carbon atoms, (ME3): optionally 0 to 30 mol %, based on the entirety of the constituent units of the water-dispersible polyester (PES), of branched aliphatic, cycloaliphatic and/or aromatic dicarboxylic acids having 4 to 12 carbon atoms, and (ME4): optionally 0 to 40 mol %, based on the entirety of the constituent units of the water-dispersible polyester (PES), of aliphatic, cycloaliphatic and/or aromatic polycarboxylic acids having at least 3 carboxylic acid groups.

4. The aqueous effect basecoat material of claim 1, wherein the film-forming polymer (FP) comprises at least one water-dispersible polyurethane (PUR) incorporating polyester constituent units (PESB) which as constituent units comprise difunctional monomer units (DME).

5. The aqueous effect basecoat material of claim 1, wherein the inorganic particles (AT) comprise at least one mixed hydroxide of the general formula

$$(M_{(1-x)}^{2+}M_x^{3+}(OH)_2)(A_{z/y}^{y-}) \cdot nH_2O$$

where $M^{2+}$ represents divalent cations, $M^{3+}$ represents trivalent cations, and (A) represents anions having a valence y, x is in the range of 0.05 to 0.5, and where at least some of the anions (A) are replaced by singly charged organic anions (OA).

6. The aqueous effect basecoat material of claim 5, wherein the organic anions (OA) contain carboxylic acid groups, sulfonic acid groups and/or phosphonic acid groups as anionic groups (AG).

7. The aqueous effect basecoat material of claim 6, wherein the organic anions (OA) comprise, in addition to the anionic groups (AG), additional functional groups (c) selected from the group of hydroxyl, epoxy and/or amino groups.

8. A method of coating a substrate, comprising applying to a substrate the aqueous effect basecoat material of claim 1 as a coating composition.

9. The method of claim 8 wherein the aqueous effect basecoat material is applied as a basecoat in an OEM coat system.

10. An OEM coat system consisting of primer coat, surfacer coat, basecoat, and clearcoat, wherein the basecoat film has at least one coat of the aqueous effect basecoat material of claim 1.

* * * * *